United States Patent
Wells et al.

(10) Patent No.: US 8,285,672 B2
(45) Date of Patent: Oct. 9, 2012

(54) DECLARATIVE FEDERATION OF REGISTRIES

(75) Inventors: John Wells, Scotch Plains, NJ (US); Larry Feigen, Watchung, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 442 days.

(21) Appl. No.: 12/608,382

(22) Filed: Oct. 29, 2009

(65) Prior Publication Data

US 2011/0107352 A1    May 5, 2011

(51) Int. Cl.
    *G06F 17/30* (2006.01)
(52) U.S. Cl. ......... 707/610; 707/667; 707/670; 707/671
(58) Field of Classification Search .................. 707/610, 707/667, 670, 671
    See application file for complete search history.

(56) References Cited

U.S. PATENT DOCUMENTS

| | | | | |
|---|---|---|---|---|
| 5,764,906 | A * | 6/1998 | Edelstein et al. | 709/219 |
| 7,484,243 | B2 * | 1/2009 | Dankovich et al. | 726/8 |
| 8,036,953 | B2 * | 10/2011 | Hsu et al. | 705/27.1 |
| 8,069,435 | B1 * | 11/2011 | Lai | 717/106 |
| 2003/0084116 | A1 * | 5/2003 | Musante et al. | 709/217 |
| 2004/0128670 | A1 * | 7/2004 | Robinson et al. | 718/1 |
| 2004/0236633 | A1 * | 11/2004 | Knauerhase et al. | 705/26 |
| 2005/0152380 | A1 * | 7/2005 | Lee et al. | 370/401 |
| 2008/0069082 | A1 * | 3/2008 | Patrick | 370/351 |
| 2008/0069124 | A1 * | 3/2008 | Patrick | 370/401 |
| 2009/0070456 | A1 * | 3/2009 | Brown et al. | 709/224 |
| 2009/0172025 | A1 * | 7/2009 | Ristock et al. | 707/104.1 |
| 2009/0216716 | A1 * | 8/2009 | Punaganti et al. | 707/3 |
| 2010/0017368 | A1 * | 1/2010 | Mao et al. | 707/3 |

OTHER PUBLICATIONS

"OSGi in a Nutshell", Mar. 1, 2004, pp. 1-3; http://gravity.sourceforge.net/servicebinder/osginutshell.html.

* cited by examiner

*Primary Examiner* — Hanh Thai
(74) *Attorney, Agent, or Firm* — Squire Sanders (US) LLP

(57) ABSTRACT

A registry helper is configured to facilitate the declarative federation of registries. The registry helper includes a reader module configured to read a declarative description for a target registry to obtain parameters pertaining to mirroring of the target registry in a federated registry. The registry helper also includes a listener registering module configured to register a listener for the target registry that enables external monitoring of the target registry based on the declarative description parameters and a change detecting module configured to detect a modification to the target registry via the listener. The registry helper further includes an updating module configured to update the federated registry in accordance with the detected modification to the target registry such that the federated registry mirrors the services of the target registry.

19 Claims, 3 Drawing Sheets

DECLARATIVE FEDERATION OF REGISTRIES

FIELD

One embodiment is directed generally to computer systems, and in particular to registries in computer systems.

BACKGROUND

Open specifications such as the Open Services Gateway Initiative ("OSGi") have been developed for the delivery of managed services to networked environments. The OSGi specification defines the OSGi Service Platform, which consists of the OSGi framework and a set of standard service definitions. The OSGi framework includes a services platform and a deployment infrastructure. The services platform includes a service registry that allows service providers to be discovered through queries formulated in a Lightweight Directory Access Protocol ("LDAP") syntax.

While OSGi discusses "a" service registry, generally, disparate internal service registries exist in an enterprise system. Accordingly, implementations of a single OSGi registry have been created that mirror the entries of more than one internal registry in the OSGi registry. However, in order to mirror entries from an internal in-memory registry in the OSGi service registry, it is generally necessary to use the OSGi Application Programming Interface ("API") pertaining to each registry. In such an implementation, the code is generally tightly coupled since all internal registries to be federated in the OSGi service registry have dependencies on the OSGi API itself. This leads to heavy dependencies in the code and a non-modular system. Further, code mirroring of the internal registries is ad-hoc in nature and generally does not deal with internal service objects of an internal registry being modified or removed.

SUMMARY

In an embodiment, a registry helper is configured to facilitate the declarative federation of registries. The registry helper includes a reader module configured to read a declarative description for a target registry to obtain parameters pertaining to mirroring of the target registry in a federated registry. The registry helper also includes a listener registering module configured to register a listener for the target registry that enables external monitoring of the target registry based on the declarative description parameters and a change detecting module configured to detect a modification to the target registry via the listener. The registry helper further includes an updating module configured to update the federated registry in accordance with the detected modification to the target registry such that the federated registry mirrors the services of the target registry.

BRIEF DESCRIPTION OF THE DRAWINGS

In order that the embodiments of the invention will be readily understood, a more particular description of the invention briefly described above will be rendered by reference to specific embodiments that are illustrated in the appended drawings. While it should be understood that these drawings illustrate only typical embodiments of the invention and are not therefore to be considered to be limiting of its scope, the invention will be described and explained with additional specificity and detail through the use of the accompanying drawings, in which.

DETAILED DESCRIPTION

In some embodiments, a registry helper is configured to facilitate the declarative federation of registries. Individual, monitorable target internal registries are combined into a single federated (i.e., "mirrored") registry that contains and makes available the services thereof via a common API. The monitorable internal registries are declaratively described in a declarative description that is stored in memory, which may be, for instance, an Extensible Markup Language ("XML") file contained in a Java Archive ("JAR") file that houses code for the internal, or local, registry. The registry helper may be implemented as an extender module that uses the declarative description in the JAR file in order to monitor the individual internal (or local) registries and copy entries from these internal registries into the federated registry. The registry helper detects modifications to the internal registry, such as additions of, changes to and deletions of service objects in the target registry. In this manner, a single, federated registry containing up-to-date representations of the services of multiple internal registries may be facilitated in a declarative manner.

While a Java implementation is discussed above, other programming languages, file types and programming constructs may be used. Further, all embodiments are not limited to OSGi. For instance, in some embodiments, a federated registry may be implemented outside of OSGi using class listeners.

Figure 1:
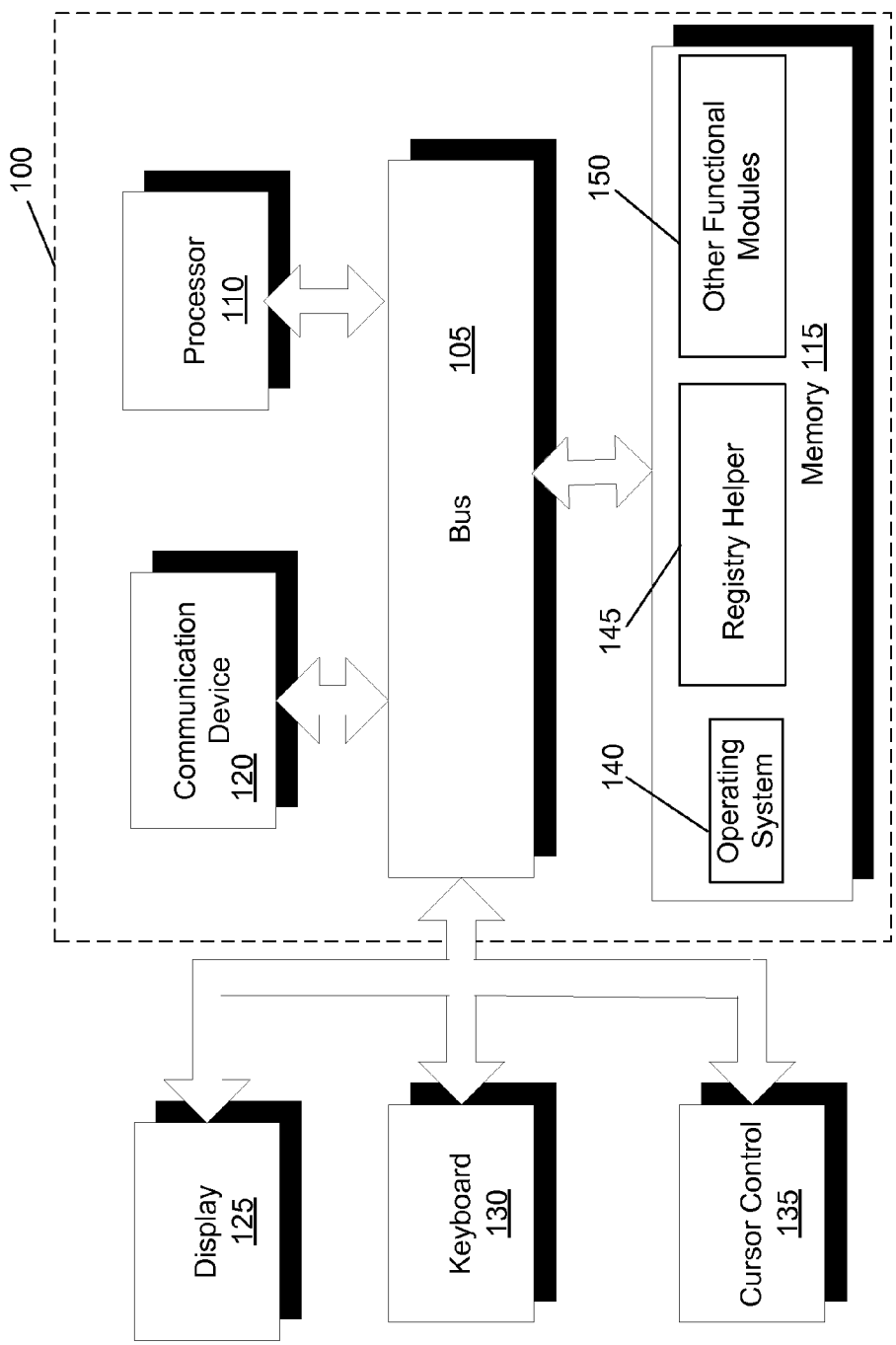
FIG. 1 is a block diagram illustrating a server having a registry helper that can implement an embodiment of the present invention.

FIG. 1 is a block diagram of a server 100 that can implement an embodiment of the present invention. Server 100 includes a bus 105 or other communication mechanism for communicating information, and a processor 110 coupled to bus 105 for processing information. Processor 110 may be any type of general or specific purpose processor, including a central processing unit ("CPU") or application specific integrated circuit ("ASIC"). Server 100 further includes a memory 115 for storing information and instructions to be executed by processor 110. Memory 115 can be comprised of any combination of random access memory ("RAM"), read only memory ("ROM"), flash memory, cache, static storage such as a magnetic or optical disk, or any other types of computer readable media or combination thereof. Additionally, server 100 includes a communication device 120, such as a network interface card, to provide access to a network. Therefore, a user may interface with server 100 directly, or remotely through a network or any other method.

Computer readable media may be any available media that can be accessed by processor 110 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 110 is further coupled via bus 105 to a display 125, such as a Liquid Crystal Display ("LCD"), for displaying information to a user, such as server status information. A keyboard 130 and a cursor control device 135, such as a computer mouse, is further coupled to bus 105 to enable a user to interface with server 100.

In one embodiment, memory 115 stores software modules that provide functionality when executed by processor 110. The modules include an operating system 140 that provides operating system functionality for server 100. The modules further include a registry helper 145 that is configured to facilitate the declarative federation of registries. Server 100 can be part of a larger system such as a cluster computing system, a distributed computing system, a cloud computing system, a "server farm" or any other system having multiple servers and/or computing devices. Server 100 will typically include one or more additional functional modules 150 to include additional functionality. In some embodiments, registry helper 145 may be part of operating system 140 or part of one or more other functional modules included in other functional modules 150.

It should be noted that many of the functional features described in this specification have been presented as modules in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be at least partially implemented in software for execution by various types of processors. An identified unit of executable code in a software module may, for instance, comprise one or more physical or logical blocks of computer instructions which may, for instance, be organized as an object, procedure or function. Nevertheless, the executables of an identified module need not be physically located together, but may comprise disparate instructions stored in different locations that, when joined logically together, comprise the module and achieve the stated purpose for the module. Modules may be stored on a computer-readable medium, which may be, for instance, a hard disk drive, a flash device, random access memory ("RAM"), a tape drive, an optical drive, a compact disk having read-only memory ("CD-ROM") or a digital video disk having read-only memory ("DVD-ROM"), or any other such medium used to store data. The medium may be read-only or read/write.

Indeed, a unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
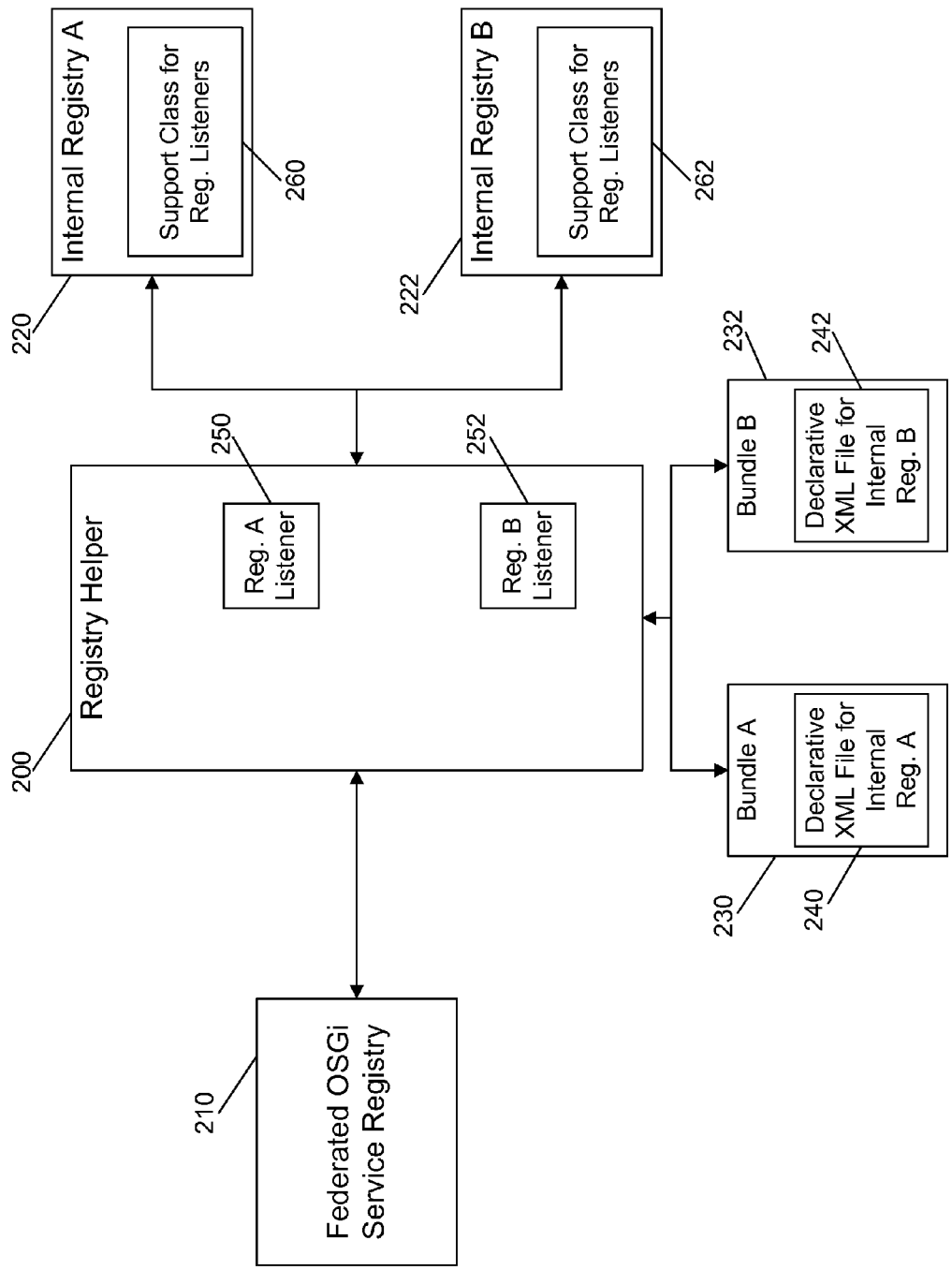
FIG. 2 is a block diagram illustrating a registry helper, a federated OSGi service registry and internal registries according to an embodiment of the present invention.

FIG. 2 is a block diagram illustrating a registry helper 200, a federated OSGi service registry 210 and internal registries 220 and 222 according to an embodiment of the present invention. In some embodiments, registry helper 200 may be registry helper 145 of server 100 of FIG. 1. In this embodiment, the blocks represent interactions between software modules. The registry helper is implemented as a Java bundle. As shown, registry helper 200 is capable of communication with federated OSGi service registry 210, internal registry A 220 and internal registry B 222. When bundles that wish to mirror one or more registries, such as bundle A 230 and bundle B 232, are added, registry helper 200 detects the addition of the new bundles and further detects that each bundle has declarative XML registry helper files. In this case, bundle A 230 has a declarative XML file 240 that indicates that bundle A 230 should mirror internal registry A 220 and bundle B 232 has a declarative XML file 242 that indicates that bundle B 232 should mirror internal registry B 222.

In some embodiments, each declarative XML file for registry helper 200 must conform with a particular schema. The OSGi MANIFEST file, which may contain information such as the bundle name, bundle description, bundle version, bundle activator, import package and export package, may have an entry, perhaps named "Registry-Description", for example, that takes a comma-separated list of files conforming to the registry helper schema. For instance, a declarative file for registry helper 200 may be as follows:

```xml
<schema xmlns="http://www.w3.org/2001/XMLSchema"
        targetNamespace="http://www.oracle.com/ns/msa/rox"
        xmlns:tns="http://www.oracle.com/ns/msa/rox"
    version="1.0">
        <complexType name="registry-type">
            <sequence>
                <element name ="registry-description-identifier" type="string"></element>
                <element name ="register-listener-class" type="string"></element>
                <element name ="register-listener-method" type="string"></element>
                <element name ="unregister-listener-class" type="string" maxOccurs="1"
                    minOccurs="0"></element>
                <element name ="unregister-listener-method" type="string" maxOccurs="1"
                    minOccurs="0"></element>
                <element name ="service-object-method" type="string" maxOccurs="1"
                    minOccurs="0"></element>
                <element name ="object-key-method" type="string" maxOccurs="1"
                    minOccurs="0"></element>
                <element name="service-classes" type="tns:service-classes-type">
                </element>
                <element name ="properties" type="tns:properties-type" maxOccurs="1"
                    minOccurs="0"></element>
            </sequence>
        </complexType>
        <complexType name="properties-type">
            <sequence>
                <element name ="property" type="tns:property-type"
                    maxOccurs="unbounded" minOccurs="1"></element>
```

```
            </sequence>
        </complexType>
        <complexType name="property-type">
            <sequence>
                <choice maxOccurs="1" minOccurs="1">
                    <element name="name" type="string"></element>
                    <element name="derived-name" type="string"></element>
                </choice>
                <choice maxOccurs="1" minOccurs="1">
                    <element name="value" type="string"></element>
                    <element name="derived-value" type="string"></element>
                </choice>
            </sequence>
        </complexType>
        <complexType name="service-classes-type">
            <sequence>
                <element name ="service-class" type="string"
                    maxOccurs="unbounded" minOccurs="1"></element>
            </sequence>
        </complexType>
        <complexType name="registries-type">
            <sequence>
                <element name ="registry" type="tns:registry-type"
                    maxOccurs="unbounded" minOccurs="0"></element>
            </sequence>
        </complexType>
        <element name="registries">
        <complexType>
            <complexContent>
                <extension base="tns:registries-type">
                    <attribute name="schemaVersion" type="decimal" use="optional" />
                </extension>
            </complexContent>
        </complexType>
        </element>
</schema>
```

In this example, the registry stanza describes a registry that is to be mirrored in another registry, such as federated OSGi service registry 210. There may be multiple registry stanzas in a single registry helper file. Each registry stanza describes a different mapping to be tracked by registry helper 200.

The registry-type/registry-description-identifier string element gives a unique identifier for this registry. The identifiers for all of the mappings in all of the registry helper files in a bundle, such as bundles 230 and 232, should be unique. If registry helper 200 detects that a bundle has two mappings (even if they are different registry helper files) with the same identifier, a warning message may be provided.

The registry-type/registry-listener-class string element gives the fully qualified class name of the class that is used to register a listener on the internal registry. The registry-type/registry-listener-method string element gives the name of the method that registry helper 200 should call on the registry-listener-class in order to register a listener on the target registry, such as internal registry 220 or 222. This method name may contain periods (".") and if this is the case, each method delimited by periods will be called in sequence order to get the eventual setter method. The first method in the chain of methods that is called should be a static method. For instance, if the registry-listener-method is "getInstance.addFooListener", the method "getInstance" would be called on the registry-listener-class. Then, the method "addFooListener" would be called on the result from the "getInstance" method. The last method in the dotted chain of methods should be of the form:
    void    anyMethodName(com.oracle.core.registryhelper-.RegistryListener listener); This method may have the access modifier private, package, protected or public and should not throw any exceptions. The method may return any value that is desired, but the value returned by the method will be ignored by registry helper 200.

The optional registry-type/unregister-listener-class string element gives the name of the class that can be used to unregister a listener on the internal registry. If not specified, this field will default to the value of the register-listener-class. This exists for the rare case that the unregister listener method is called on a different class from the register listener method.

The optional registry-type/unregister-listener-method string element gives the name of the method to be called on the unregister-listener-class in order to remove a listener from the set of listeners listening on an internal registry. The method given here is also a "dotted setter" and follows the same semantics as discussed above with respect to registry-type/registry-listener-class. If this field is not set, there is no mechanism to remove a listener from the set of listeners listening on an internal registry and registry helper 200 will not attempt to remove its listeners from that registry, even when shutting down. However, those registered listeners that should have been removed will perform no further actions even in the case that events fire on them.

The optional registry-type/service-object-method string element gives the method to call on the object returned in the listener in order to get the object that should be placed in federated OSGi service registry 210. If not specified (or having the value "this") then the object returned in the listener is itself the object that should be placed into federated OSGi service registry 210. The method given is a "dotted getter" and follows similar rules as discussed above with respect to registry-type/registry-listener-class, except that in this case, the final method in the string is also a getter method as opposed to a setter method.

The optional registry-type/object-key-method string element gives the method to call on the object returned in the listener in order to get a suitable key for the object. The key returned should be suitable for use in a HashMap. If not specified (or having the value "this"), then the object returned in the listener is itself suitable to be used as a key to uniquely identify the service object. The optional registry-type/service-classes stanza gives the list of service classes under which this object should be registered. It will be of type service-classes-type. There will be at most one service-classes stanza in a registry stanza.

The required service-classes-type/service-class string element gives the name of a fully qualified service class that the service object should be assignable to. There may be multiple service-class elements inside a service-classes stanza. In such as case, the service object should be assignable to all of the classes named.

The optional registry-type/properties stanza gives information about properties that should be associated with the service object registration. It will be of type properties-type. There will be at most one properties stanza in a registry stanza.

The required properties-type/property stanza gives information about a specific property that should be associated with the service object registration. It will be of type property-type. There can be multiple property stanzas in a properties stanza.

The property-type/name string element gives the exact key in a key/value pairing of a property to be associated with the service object registration. The property-type/derived-name string element gives the name of the method to call to find the key in a key/value pairing of a property to be associated with the service object registration. Either one of the "name" element or the "derived-name" element should be present in the property stanza. The name of the method should be a "dotted getter" and should follow the behavior discussed above with respect to the registry-type/service-object-method.

The property-type/value string element gives the exact value as a java.langString in a key/value pairing of a property to be associated with the service object registration. The property-type/derived-value string element will give the name of the method to call to find the value in a key/value pairing of a property to be associated with the service object registration. Either one of the "value" element or the "derived-value" element should be present in the property stanza. The name of the method should be a "dotted getter" and should follow the behavior discussed above with respect to the registry-type/service-object-method.

When registry helper 200 detects a bundle that has one or more registry helper files, registry helper 200 parses each file and begins monitoring the specified registry or registries that are declared in each file, placing them in federated OSGi service registry 210 as specified. Any parsing errors that occur may be logged. In this case, declarative XML file 240 indicates that bundle A 230 would like to mirror internal registry A 220 and declarative XML file 242 indicates that bundle B 232 would like to mirror internal registry B 222. The services from internal registries 220 and 222 are then mirrored in federated OSGi service registry 210.

Based on the registry-listener-class and registry-listener-method stanzas of the declarative XML files, registry helper 200 instantiates registry A listener 250 and registry B listener 252, respectively. Both internal registry A 220 and internal registry B 222 contain support classes 260 and 262 that support the addition of registry listeners. This enables registry helper 200 to track changes in internal registries 220 and 222. When services are added/changed/removed in either of internal registries 220 or 222, respective support classes 260 or 262 notify respective registry listener 250 or 252, which detects the event based on the notification. Registry helper 200 can then update the federated OSGi service registry 210 to reflect the service changes. In this manner, registry mirroring can be event driven and dynamic, allowing federated OSGi service registry 210 to mirror the services that are actually offered in monitored registries at any given time.

Figure 3:
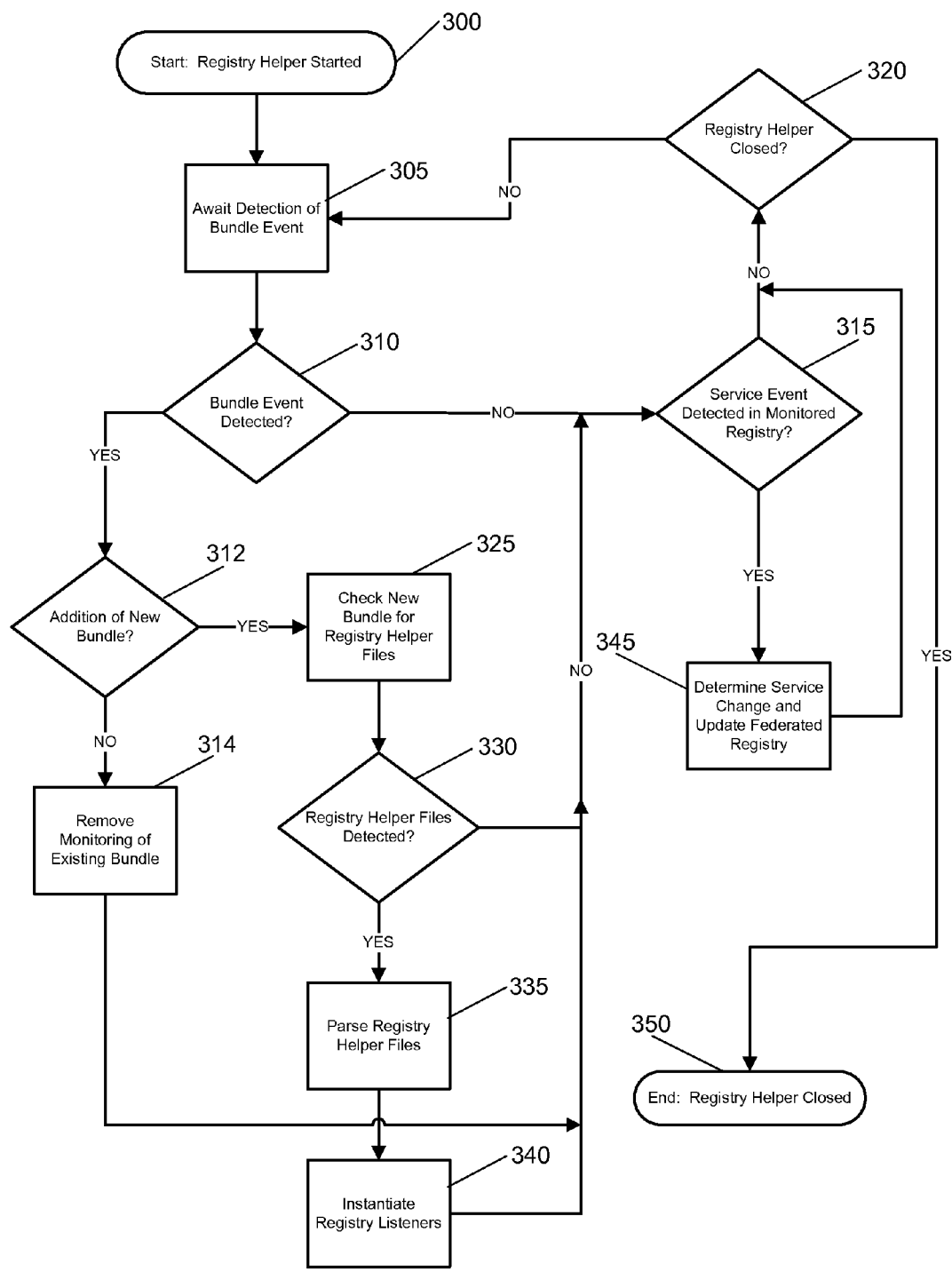
FIG. 3 is a flow diagram illustrating a process flow for the declarative federation of registries according to an embodiment of the present invention.

FIG. 3 is a flow diagram illustrating a process flow for the declarative federation of registries according to an embodiment of the present invention. In some embodiments, the functionality of FIG. 3 is implemented by software stored in memory or other computer readable media, and executed by a processor. In other embodiments, the functionality may be performed by hardware (e.g., through the use of an ASIC, a programmable gate array ("PGA"), a field programmable gate array ("FPGA"), etc.), or any combination of hardware and software.

In some embodiments, the process of FIG. 3 may be performed, for example, by server 100 of FIG. 1 via registry helper 145. In FIG. 3, the process flow begins with registry helper 145 being started at 300. The computer on which registry helper 145 is running, such as a server, then awaits detection of a bundle event at 305. This could be performed iteratively or else be associated with, and triggered by, an event. The bundle events in this embodiment may be the detection of a new bundle or an indication to remove monitoring for an existing bundle, but in other embodiments, other bundle events are possible. If a bundle event is not detected at 310, registry helper 145 will proceed to determine whether a service event is detected in a monitored registry at 315. Since no registries are as of yet being monitored, this will be answered in the negative and if the registry helper has not closed at 320, registry helper 145 will continue to await detection of a bundle event at 305.

If a bundle event is detected at 310, registry helper 145 determines whether the bundle event is the addition of a new bundle at 312. If so, registry helper 145 checks the new bundle for registry helper files at 325. If registry helper files are not detected at 330, registry helper 145 will proceed to determine whether a service event is detected in a monitored registry at 315 and continue as discussed above. If registry helper files are detected, registry helper 145 will parse the files at 335 and instantiate appropriate registry listeners at 340. Registry helper 145 then determines whether a service event is detected in a monitored registry by a listener at 315. If yes, registry helper 145 determines the nature of the service change and updates the federated registry accordingly. If the bundle event is not the addition of a new bundle at 312, in this embodiment, the event must be an indication to remove a monitored bundle. Registry helper 145 removes the monitored bundle at 314. The process then iteratively continues in the manner illustrated in FIG. 3.

As disclosed, an embodiment is a registry helper that is configured to facilitate the declarative federation of registries. The registry helper determines whether bundles contain registry helper files and if so, parses the files to obtain the parameters contained therein, including a registry listener class and method. The registry helper mirrors the target registries in a federated service registry. The registry helper then instantiates registry listeners for each target registry indicated in the parsed parameters and begins listening on the target registries, which may be internal registries. When modifications to the target registry, which may include additions of, changes to or deletions of one or more service objects in the target registry, are detected by a registry listener for the associated target registry, the registry helper updates the federated service registry accordingly.

While the term "server" has been used in the description of some embodiments of the present invention, the invention may be applied to many types of network computing devices. For purposes of this invention, the term "server" includes rack computing systems, cloud computing systems, distributed computing systems, personal computers, laptops, cell phones, personal digital assistants, tablet computing devices, mainframes, any networked devices that perform computing operations, and any of these physical servers. A server may also be an application server, such as Oracle WebLogic Server®, and may be run as software on a single physical server or distributed across multiple physical servers.

One having ordinary skill in the art will readily understand that the invention as discussed above may be practiced in a different order, and/or with hardware elements in configurations that are different than those that are disclosed. Therefore, although the invention has been described based upon these preferred embodiments, it would be apparent to, and readily appreciated by, those of ordinary skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

What is claimed is:

1. A non-transitory computer readable medium having instructions stored thereon that, when executed by a processor, cause the processor to facilitate declarative federation of registries, comprising:
   reading a declarative description for a target registry to obtain parameters pertaining to mirroring of the target registry in a federated registry;
   registering a listener for the target registry that enables external monitoring of the target registry based on the declarative description parameters;
   detecting a modification to the target registry via the listener; and
   updating the federated registry in accordance with the detected modification to the target registry, wherein the updated federated registry mirrors the services of the target registry.

2. The computer readable medium of claim 1, wherein the target registry is declaratively described in a Java Archive file that houses code for the target registry.

3. The computer readable medium of claim 1, wherein the declarative description of the target registry is an Extensible Markup Language file indicating how the target registry should appear to other registries.

4. The computer readable medium of claim 1, wherein the functionality of the target registry is not affected by the mirroring.

5. The computer readable medium of claim 1, further configured to cause the processor to:
   unregister the listener for the target registry when mirroring of the target registry in the federated registry is no longer desired.

6. The computer readable medium of claim 1, wherein the instructions comprise a registry helper module that facilitates the mirroring of the target registry in the federated registry.

7. The computer readable medium of claim 1, wherein the target registry is an internal registry of a software application and the federated registry is an Open Services Gateway Initiative registry.

8. The computer readable medium of claim 1, wherein multiple target registries are monitored and mirrored in the federated registry.

9. The computer readable medium of claim 1, wherein the modification to the target registry comprises an addition of, a change to or a deletion of one or more service objects in the target registry.

10. A registry helper that facilitates declarative federation of registries, comprising:
    a processor; and
    a memory coupled to the processor and storing modules that when executed by the processor provide functionality, the modules comprising:
    a reader module configured to read a declarative description for a target registry to obtain parameters pertaining to mirroring of the target registry in a federated registry;
    a listener registering module configured to register a listener for the target registry that enables external monitoring of the target registry based on the declarative description parameters;
    a change detecting module configured to detect a modification to the target registry via the listener; and
    an updating module configured to update the federated registry in accordance with the detected modification to the target registry, wherein the updated federated registry mirrors the services of the target registry.

11. The registry helper of claim 10, wherein the target registry is declaratively described in a Java Archive file that houses code for the target registry.

12. The registry helper of claim 10, wherein the declarative description of the target registry is an Extensible Markup Language file indicating how the target registry should appear to other registries.

13. The registry helper of claim 10, further comprising:
    a listener unregistering module configured to unregister the listener for the target registry when mirroring of the target registry in the federated registry is no longer desired.

14. The registry helper of claim 10, wherein multiple target registries are monitored by the registry helper and mirrored in the federated registry.

15. The registry helper of claim 10, wherein the modification to the target registry comprises an addition of, a change to or a deletion of one or more service objects in the target registry.

16. A computer-implemented method for facilitating declarative federation of registries, comprising:
    a processor; and
    a computer readable medium coupled to the processor;

reading a declarative Extensible Markup Language file for an internal registry that is stored in a Java Archive file to obtain parameters pertaining to mirroring of the internal registry in a federated registry;

registering by the processor a listener for the internal registry that enables external monitoring of the internal registry based on one or more declarative description parameters that indicate the name of a method that should be called on a Java-implemented registry listener class in order to register the listener on the internal registry;

detecting by the processor a modification to the internal registry via detection of an event by the registered listener; and updating by the processor the federated registry in accordance with the detected modification to the internal registry, wherein the updated federated registry mirrors the services of the internal registry.

17. The computer-implemented method of claim 16, further comprising:

a listener unregistering module configured to unregister the listener for the internal registry when mirroring of the internal registry in the federated registry is no longer desired.

18. The computer-implemented method of claim 16, wherein multiple target registries are monitored and mirrored in the federated registry.

19. The computer-implemented method of claim 16, wherein the modification to the internal registry comprises an addition of, a change to or a deletion of one or more service objects in the internal registry.

* * * * *